United States Patent [19]

Goldman et al.

[11] 4,169,382
[45] Oct. 2, 1979

[54] AQUARIUM THERMOMETER

[75] Inventors: Marvin A. Goldman, Great Neck; Jerome N. Goldman, New York; Arthur Gilmore, Greenlawn, all of N.Y.; Silvio J. DiMarchi, Wychoff, N.J.

[73] Assignee: Penn-Plax Plastics, Inc., Garden City, N.Y.

[21] Appl. No.: 916,500

[22] Filed: Jun. 19, 1978

[51] Int. Cl.² ............................................. G01K 1/14
[52] U.S. Cl. ....................................... 73/376; 73/374; 73/343 B
[58] Field of Search ................. 73/371, 374, 376, 377, 73/378, 353, 431, 343 R, 343 B; 335/285

[56] References Cited

U.S. PATENT DOCUMENTS

| | | | |
|---|---|---|---|
| 2,482,228 | 9/1949 | Wappner | 73/376 |
| 2,507,559 | 5/1950 | D'Andrea | 335/285 |
| 3,161,058 | 12/1964 | Willinger | 73/376 |
| 3,208,090 | 9/1965 | Roesel | 15/220 |
| 3,518,884 | 7/1970 | Wood | 73/374 |
| 3,827,020 | 7/1974 | Okamoto | 335/285 |

Primary Examiner—S. Clement Swisher
Assistant Examiner—Denis E. Corr
Attorney, Agent, or Firm—Mandeville and Schweitzer

[57] ABSTRACT

An aquarium thermometer is provided which may be selectively, horizontally positioned at a plurality of depths along a wall of an aquarium tank for comparing the temperatures at different levels to ascertain and to monitor temperature gradients in the tank. The thermometer assembly of the invention includes a water tight house having spaced ferrous components or magnets adjacent the opposite ends of the thermometer scale. A separate positioning handle, having similarly spaced, registerable magnets at its opposite ends, is adapted to cooperate with the thermometer housing on the wall, to cause the thermometer inside the tank to move correspondingly with the handle. The positioning handle and the thermometer housing may mount pairs of oppositely polarized magnets.

8 Claims, 6 Drawing Figures

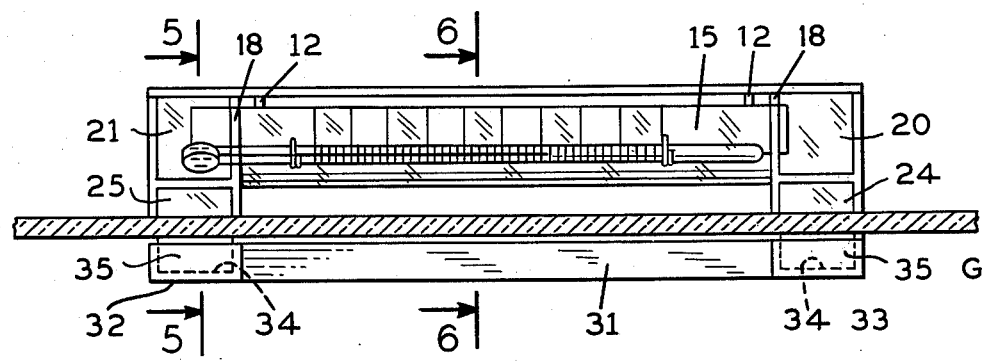
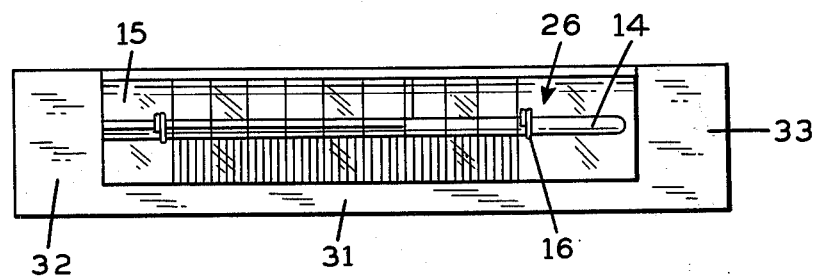
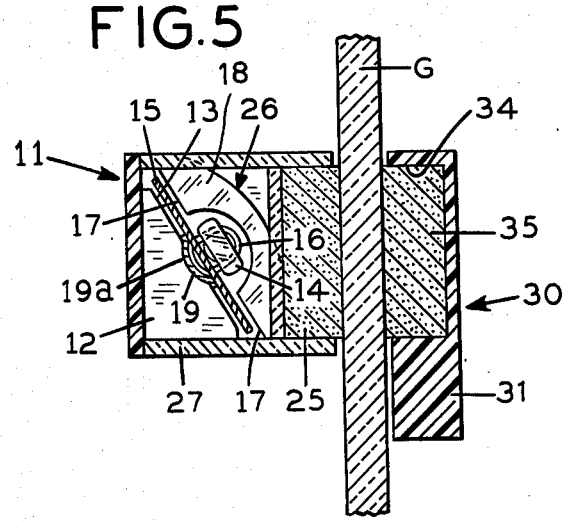
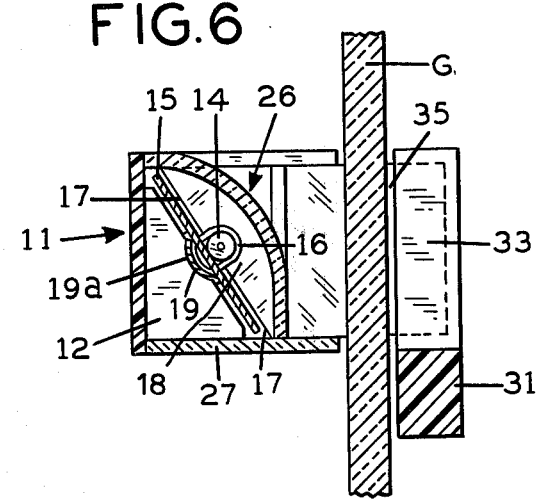

AQUARIUM THERMOMETER

BACKGROUND AND GENERAL DESCRIPTION OF THE INVENTION

This invention relates to thermometers for monitoring the temperature gradients of aquariums. As will be appreciated, fish are sensitive to temperature variations. This is particularly true of tropical fish, many varieties of which are extemely sensitive to sudden changes in their environment. These fish may succumb to a change in temperature in the aquarium body of water when they are exposed to such temperature changes, even for short periods of time. Because of these problems, many forms of aquarium tank pumps and recirculating systems have been devised in order to constantly circulate the water of the tank through aerators and heaters in order to maintain an equilibrium temperature and oxygen content of the body of water contained in the aquarium.

However, at times, because of inadequate positioning of the outlets for the recirculation system and because of minor movements or changes in the positioning of those outlets, the circulation can be such as to allow for portions of the body of water in the aquarium tank to vary in temperature by several degrees from the upper level of the body of water to the depths thereof. Obviously, such variations may be determined by positioning several different thermometers in a tank. Indeed, Aquarium thermometers have been constructed to hang over the side wall of the tank, to float in the tank, or to sink to the bottom of the tank to provide for a single depth position of the thermometer. These thermometers measure only the temperature where the sensing bulb of the thermometer is positioned. With a conventional aquarium tank with a body of water having a depth of, for example, two feet, the sensing bulb of the thermometer may be positioned approximately one foot below the surface of the body of water. Thus, the thermometer is measuring only the prevailing temperature in the body of water in the aquarium tank at a level halfway from the bottom to the top. Because of the fluctuations in circulation noted above, the prevailing temperature at the bottom of the tank may vary by several degrees from the prevailing temperature at the top or surface of the body of water. Thus, fish swimming in the tank may be exposed to a substantial variation in temperature between the top and the bottom of the tank.

Of course, temperature gradients may be measured simply by moving one conventional thermometer from the top of the tank toward the bottom, in order to measure the temperature there. However, this requires inserting a hand or an instrument into the tank, which may contaminate the tank and disturb the fish unnecessarily.

Moreover, this may require holding the thermometer at a position for several minutes to secure an intermediate level reading.

With the thermometer assembly of the present invention by contrast, a new and improved aquarium thermometer instrument is provided which allows for positioning the thermometer horizontally at any level along a vertical wall of the aquarium tank, with that positioning being determined and controlled from outside the tank, with no need for insertion of any objects or hands in the tank water for moving the thermometer from one level to another. This is achieved by mounting the thermometer in a waterfront housing containing a spaced pair of ferrous or magnetic components. A separate positioning handle is placed opposite the thermometer housing on the outside of the wall in registry with the housing. The handle, in turn, contains a spaced pair of ferrous or magnetic components. Thus, the ferrous or magnetic component of the handle attract the ferrous or magnetic components contained in the thermometer housing so that by moving the handle on the outside of the wall of the tank the thermometer housing inside the aquarium is moved to various levels, as desired, for determining the prevailing temperature at different depths in the tank.

With the foregoing and additional objects in view, this invention will now be described in more detail, and other objects and advantages thereof will be apparent from the following description, the accompanying drawings, and the appended claims.

DESCRIPTION OF THE DRAWINGS

FIG. 3 is a top plan view of the thermometer of the present invention showing it mounted on a glass wall which plan view is taken along line 33 of FIG. 1;

FIG. 4 is a front elevational view of the thermometer and handle of the present invention; FIG. 5 is a cross-sectional view of the new aquarium thermometer taken along line 55 of FIG. 3; and FIG. 6 is a cross-sectional view of the new thermometer taken along line 66 of FIG. 3.

DETAILED DESCRIPTION OF THE PRESENT INVENTION

Figure 1:
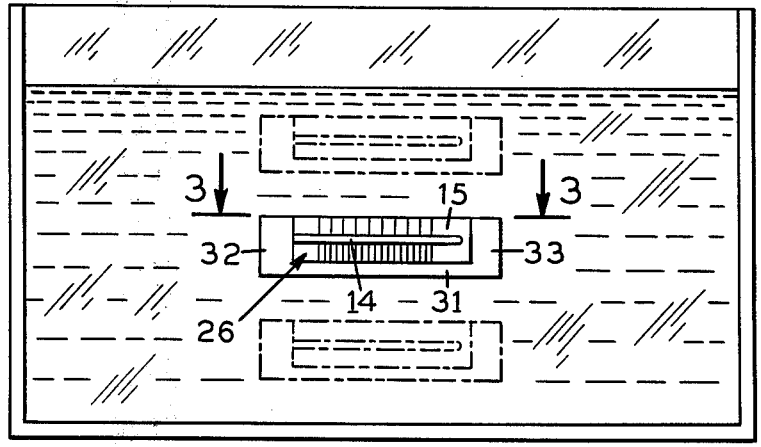
FIG. 1 is a front elevational view of an aquarium showing the new magnetically mounted thermometer in an intermediate position and indicating in phantom an upper and lower position of said thermometer.

Referring now to FIGS. 1 and 3 the new aquarium thermometer of the present invention generally includes a one-piece transparent, non-toxic plastic thermometer housing 10 closed off and ultrasonically sealed in a watertight manner by a rear-wall component 11 having integral support legs 12 having upper surfaces 13 which are canted at a 60 degree angle with respect to the horizontal bottom wall of the housing 10. A conventional glass thermometer 14 is secured to a thermometer scale 15 by circular wire connectors or staples 16 to form a thermometer sub-assembly which is sandwiched securely and immovably into place in the housing 10 between the upper surfaces 13 of the rear wall number 11 and corresponding integrally canted support surfaces 17 formed on legs 18 in the opposite ends of the housing 10, as shown best in FIG. 5.

Figure 2:
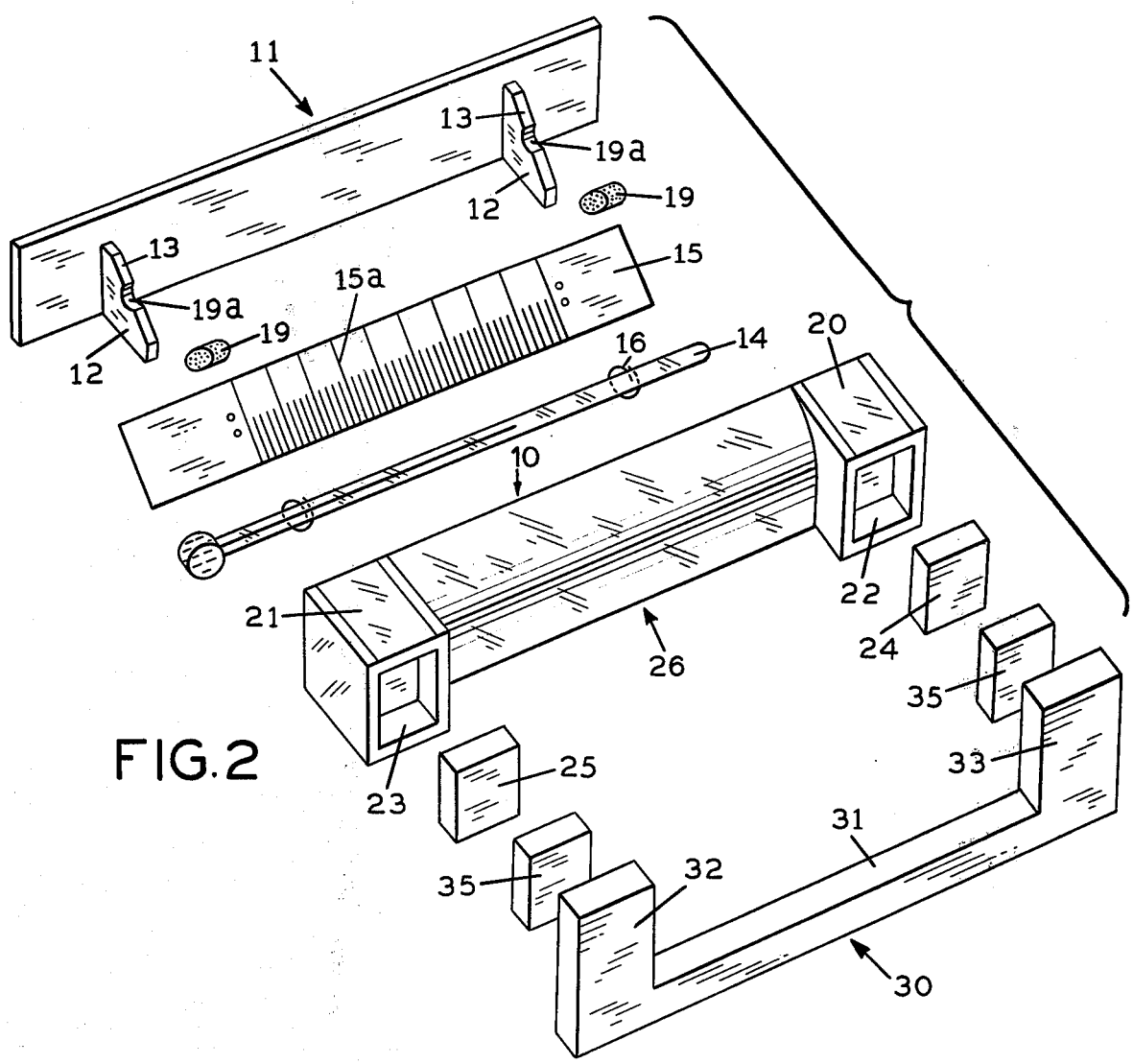
FIG. 2 is an exploded perspective view of the components of the new aquarium thermometer of the present invention.

More specifically and referring to FIGS. 2, 5, and 6, the housing 10 includes generally cubical end portions 20 and 21 which include recessed forwardly facing socket portions 22 and 23 into which are force fit, or otherwise permanently secured, a pair of magnets 24, 25 respectively. Between the generally cubical end portions 20, 21 the housing includes an arcuate (in cross section) window 26 which extends from the upper plane of the housing 10 to the lower horizontal plane of the housing 10, (the upper and lower planes of said housing 10 are coextensive with the upper nd lower walls of the cubical end portions 20, 21). The lowermost portion of the curved front window 26 terminates at the bottom wall 27 of the transparent housing 10 which is coplanar and coextensive with the bottom walls of the end cubical portions 20,21.

The shallow u-shaped positioning handle 30 of the present invention includes in elongated bar-like member 31 connected between two vertical legs 32 and 33. The positioning handle 30 is formed of a single piece of non-toxic plastic; the inner sides of the legs 32 and 33 include sockets 34 which in turn mount by force fitting or other suitable securement magnets 35 which are generally similar in shape and size to the magnets or ferrous components 24,25 mounted in the housing 10. The bar 31 is disposed below the front window 26 of the housing 10 when the magnetic components of the housing and 10 and the positioning handle 30 are registered as shown in FIG. 5 and FIG. 6. The new aquarium thermometer assembly lends itself to rapid assembly as follows:

The thermometer subassembly including the glass thermometer 14 mounted on the planar temperature scale 15 which is of course appropriately divided by graduations 15-a, is placed in the housing 10 with the front face of the scale 15 bearing against the canted surfaces 17 of the housing. The thermometer sub-assembly is secured in place and the housing assembly is completed by inserting the rear wall 11 into and against housing 10 after interposing small pieces of compressible resilient sponge material 19, which may be in the form of small foamed thermoplastics in recesses 19-a formed in the integral support legs 12. As will be appreciated the compressible sponges 19 serve to tightly sandwich the thermometer sub-assembly in place in the housing between the opposed cantered surfaces 13 and 17 of the rear wall 11 and the transparent housing 10 respectively. The rear wall 11 is then ultrasonically sealed to the housing to form a watertight enclosure for the thermometer sub-assembly. The remaining assembly steps necessary to complete the new aquarium thermometer involve a simple insertion of the square magnetic and/or ferrous components 24 or 25 into the sockets 22 and 23 of the front housing aquarium housing and the insertion of the magnets and or ferrous components 35 into the sockets 34 formed integrally with the positioning handle 30 at the opposite ends thereof.

In use the new magnetic aquarium thermometer may be simply installed in an aquarium by placing the housing 10 on the inner surface of the glass aquarium wall G with the front window 26 facing outward. While holding the housing 10 in that position and registering the magnets 35 of the positioning handle 30 face-to-face with the magnets 24 and 25. As will be understood this will firmly mount the entire assembly to the glass wall of the aquarium with the positioning handle 30 on the outside and the thermometer housing 10 on the inside.

Thereafter, by merely grasping the thermometer positioning handle 30 between the ends thereof and along the bar 31 the thermometer may be moved to various depths and/or positions in the aquarium as desired and as indicated in FIG. 1.

While the aquarium thermometer constructions herein disclosed represent preferred embodiments, the present invention is not limited to those specific forms illustrated and described. Changes may be made therein without departing from the scope of this invention, as defined in the following claims.

We claim:
1. An aquarium thermometer assembly comprising:
 (a) an elongated one-piece housing of transparent, non-toxic, plastic having vertical front face portions;
 (b) said housing having spaced end portions defining a spaced pair of first sockets at said vertical front face portions of said housing;
 (c) first magnetic means disposed in said first sockets;
 (d) a front window extending between said end portions;
 (e) a rear wall of non-toxic plastic having integral forwardly projecting first leg means;
 (f) said housing end portions each having integral second leg means generally juxtaposed with said first leg means;
 (g) elongated glass thermometer means mounted on a planar scale member;
 (h) said planar member being sandwiched between said first and second leg means;
 (i) an elongated one-piece plastic positioning handle having second pair of spaced sockets formed at vertical rear face portions thereof;
 (j) the spacing of said first and second pairs of sockets being substantially the same;
 (k) second magnetic means being disposed in said second sockets;
 (l) whereby, upon the face-to-face registry of said first and second magnetic means, said housing may be moved along an inner surface of an aquarium wall by selective displacement of said positioning handle along an outer surface of said aquarium wall.

2. The aquarium thermometer assembly of claim 1, in which
 (a) both said leg means are canted at approximately a 60° angle to a horizontal base plane of the housing.

3. The aquarium thermometer assembly of claim 1, in which
 (a) said front window is of generally accurate cross-section.

4. The aquarium thermometer assembly of claim 1, in which
 (a) a resilient shock-absorbing means is interposed between said first leg means and said planar scale member.

5. The aquarium thermometer assembly of claim 4, in which
 (a) said shock-absorbing means is a flexible thermoplastic form.

6. The aquarium thermometer assembly of claim 1, in which
 (a) said front window is spaced rearwardly of said vertical front face portions.

7. The aquarium thermometer assembly of claim 1, in which
 (a) said rear housing wall is ultrasonically sealed to said transparent housing to provide a watertight enclosure of said thermometer means and said planar scale member.

8. The aquarium thermometer assembly of claim 7, in which a plurality of distinct
 (a) vertical graduations are carried by said planar scale member and extend completely thereacross.

* * * * *